(12) United States Patent
Min et al.

(10) Patent No.: US 8,902,247 B2
(45) Date of Patent: Dec. 2, 2014

(54) METHOD AND APPARATUS FOR BRIGHTNESS-CONTROLLING IMAGE CONVERSION

(75) Inventors: Byung-Seok Min, Seoul (KR); Hyun-Hee Park, Seoul (KR); Dong-Hoon Jang, Suwon-si (KR); Sung-Dae Cho, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 143 days.

(21) Appl. No.: 13/369,841

(22) Filed: Feb. 9, 2012

(65) Prior Publication Data

US 2012/0200589 A1 Aug. 9, 2012

(30) Foreign Application Priority Data

Feb. 9, 2011 (KR) ........................ 10-2011-0011425

(51) Int. Cl.
*G09G 5/02* (2006.01)
*G09G 5/30* (2006.01)
*H04N 1/60* (2006.01)

(52) U.S. Cl.
CPC ........... *H04N 1/6008* (2013.01); *H04N 1/6027* (2013.01); *H04N 1/6058* (2013.01)
USPC .......................................... 345/591; 345/589

(58) Field of Classification Search
CPC ... G06K 1/00; G09G 5/02; G09G 2320/0646; G09G 2360/16; G06T 5/50; G06T 2207/10024
USPC ................................................. 345/589, 591
See application file for complete search history.

(56) References Cited

U.S. PATENT DOCUMENTS

| 4,758,885 | A | 7/1988 | Sasaki et al. |
| 5,774,112 | A | 6/1998 | Kasson |
| 6,243,133 | B1* | 6/2001 | Spaulding et al. ......... 348/223.1 |
| 7,268,753 | B2* | 9/2007 | Lee et al. ........................ 345/77 |
| 2007/0091213 | A1* | 4/2007 | Jaspers ........................ 348/687 |
| 2007/0132866 | A1 | 6/2007 | Lee et al. |
| 2008/0186328 | A1 | 8/2008 | Mawatari et al. |
| 2010/0169498 | A1 | 7/2010 | Palanki et al. |
| 2010/0272013 | A1 | 10/2010 | Horn et al. |
| 2011/0149166 | A1* | 6/2011 | Botzas et al. ................. 348/649 |

FOREIGN PATENT DOCUMENTS

| EP | 1 786 214 | 5/2007 | |
| EP | 2124217 A2 * | 11/2009 | .......... G09G 3/3406 |
| JP | 2007-158446 | 6/2007 | |
| JP | 2008-131621 | 6/2008 | |

(Continued)

OTHER PUBLICATIONS

Adrian Ford and Alan Roberts, Colour Space Conversions, Aug. 11, 1998, http://www.wmin.ac.uk/ITRG/docs/coloureq.html, p. 1-31.*

(Continued)

*Primary Examiner* — Kee M Tung
*Assistant Examiner* — Yuehan Wang
(74) *Attorney, Agent, or Firm* — The Farrell Law Firm, P.C.

(57) ABSTRACT

A method and an apparatus for brightness-controlling image conversion. The method includes converting an input image of a first non-linear color space into a second linear color space; determining a brightness control ratio; adjusting channels of the second linear color space according to the brightness control ratio; converting the second linear color space into the first non-linear color space to form an output image.

10 Claims, 5 Drawing Sheets
(1 of 5 Drawing Sheet(s) Filed in Color)

(56) References Cited

FOREIGN PATENT DOCUMENTS

| JP | 2008-167418 | 7/2008 |
|---|---|---|
| WO | WO 2006/120606 | 11/2006 |
| WO | WO 2010/043996 | 4/2010 |
| WO | WO 2010/128773 | 11/2010 |

OTHER PUBLICATIONS

Anil K Jain: "Chapter 7: Image Enhancement (excerpt)", Fundamentals of Digital Image Processing, Jan. 1, 1989.

IEC 61966-2-1:1999/FDAM 1: Multimedia Systems and Equipment—Colour Measurement and Management—Default RGB Colour Space—SRGB, Amendment 1 (SC29N5039), Joint Photographic Expert Group (JPEG) Oct. 20, 2002.

Sarif Kumar Naik et al., "Hue-Preserving Color Image Enhancement Without Gamut Problem", IEEE Transactions on Image Processing, vol. 12, No. 12, Dec. 1, 2003.

Jan Morovic: "Gamut Mapping", in Gaurav Sharma: "Digital Color Imaging Handbook", CRC Press, XP055074006, Jan. 1, 2003.

\* cited by examiner

METHOD AND APPARATUS FOR BRIGHTNESS-CONTROLLING IMAGE CONVERSION

PRIORITY

This application claims priority under 35 U.S.C. §119(a) to a Korean Patent Application filed in the Korean Intellectual Property Office on Feb. 9, 2011 and assigned Serial No. 10-2011-0011425, the entire disclosure of which is incorporated herein by reference.

BACKGROUND OF THE INVENTION

1. Field of the Invention

The present invention relates generally to image processing, and, more particularly, to a method and an apparatus for brightness-controlling image conversion, which can control the brightness, of an image without reducing the image's saturation.

2. Description of the Related Art

An image captured in under low brightness conditions by a portable camera or a typical camera or an excessively bright image may include details, that a user cannot easily distinguish due to the image's low contrast and, thus, frequently require the control of the brightness of the image. An image's quality can be improved by increasing the brightness of the image which is dark as a whole, or by reducing the brightness of the image which is bright as a whole. Further, when an image includes a relatively complex structure as well as relatively complex colors, the brightness of the image is sometimes controlled. Moreover, the brightness of an image is controlled in order to improve the outdoor visibility of the image. There is an algorithm for converting a color space pf an input image and then converting only information from a channel corresponding to brightness in order to reduce a noise such as a block noise or a contour noise.

However, in the above brightness changing scheme, only a brightness channel is usually controlled, and, thus, the color impression of the original input image is often lost. Specifically, when the brightness of the image increases, the saturation thereof, as perceived by a person's eyes becomes lower. A person, who sees the image, often has the feeling that colors appear to be missing in the image. In order to correct this disadvantage, the image is first processed by an algorithm for brightness correction, before an algorithm for saturation improvement is additionally applied to the processed image. However, in this case, even such a process of applying the dual algorithms cannot compensate for the saturation according to the degree of brightness change but can compensate for only the saturation of the output image. Therefore, there is a disadvantage in that the color impression of the original image cannot be reproduced as it is.

FIG. 1 illustrates a normal scheme for brightness correction. In general, a High Dynamic Range (HDR) algorithm or noise reduction algorithm for performing input/output brightness conversion by using a histogram or mapping function which converts an Red, Green and Blue (RGB) input image 110 to a YCbCr color space 120 as illustrated in FIG. 1 and shown in Equation (1) below. The most frequently used YCbCr color space is a BT.601 version (see equation (1)) applied to an Standard Definition Television (SDTV), and divides an input RGB image into a Y channel corresponding to a brightness and a Cb-Cr color space similar to an opponent color space. A Y value is usually called "luma," and is similar to a luminance value perceived by the human eye.

$$Y = 0.299 * R + 0.587 * G + 0.114 * B$$

$$C_B = 128 - 0.168736 * R - 0.331264 * G + 0.5 * B$$

$$C_R = 128 + 0.5 * R - 0.418688 * G - 0.081312 * B \quad (1)$$

Therefore, in Equation (1), an algorithm, which is intended to be applied to a Y value among the existing algorithms for brightness control, is applied to a Y value 130 (as denoted by reference numeral 140), and converted Y' value 150 is obtained. The algorithm then converts a Y'CbCr 160, which includes the converted Y' value 150 and existing Cb-Cr values, to RGB values by using Equation (2) below, and outputs converted R'G'B' values 170.

$$R' = 298.082 * Y'/256 + 408.5 * C_R/256 - 222.921$$

$$G' = 298.082 * Y'/256 - 100.291 * C_B/256 - 208.120 * C_R/256 + 135.576$$

$$B' = 298.082 * Y'/256 + 516.412 * C_B/256 - 276.836 \quad (2)$$

Otherwise, either an Hue-Saturation-Level (HSL) color space, an Hue-Saturation-Value (HSV) color space or an Hue-Saturation-Intensity (his) color space may be used instead of a YCbCr color space. When M is max(R, G, B) and m is min(R, G, B) even though there is a slight difference between hue values and there is a slight difference between saturation (or chroma) values, a C (Chroma) is defined as (M−m), and an H (Hue) is defined by Equation (3) below.

$$H' = \begin{cases} \text{undefined}, & \text{if } C = 0 \\ \dfrac{G-B}{C} \bmod 6, & \text{if } M = R \\ \dfrac{B-R}{C} + 2, & \text{if } M = G \\ \dfrac{R-G}{C} + 4, & \text{if } M = B \end{cases} \quad (3)$$

$$H = 60° \times H'$$

Also, even though each Intensity (I) value, an Level (L) value and a Value (V) value has many forms thereof, the I, L and V values are usually defined as I=(R+G+B)/3, V=max(R, G, B), and L=(max(R, G, B)+min(R, G, B))/2

The above method for using a color space refers to a method in which either an I, L or V value corresponding to a brightness is converted and the converted I, L or V value is inversely converted again while maintaining a hue value and a saturation (or chroma) value as they are, similarly to an algorithm for correcting a brightness by using only a Y value in a YCbCr color space.

With respect to controlling only a brightness, the above color space conversion may appear to be efficient in terms of the simplicity of an algorithm and resource management. However, when brightness increases, the saturation perceived by the human eye becomes lower, as described above. A saturation perceived by the human eye is usually defined in a CIE-L*a*b* color space as follows. First, CIE-L*a*b* values are defined, from XYZ, color values measured by a color spectro-radiometer or spectro-photometer, by Equation (4) below.

$$L^* = 116 f(Y/Y_n) - 16 \quad (4)$$
$$a^* = 500[f(X/X_n) - f(Y/Y_n)]$$
$$b^* = 200[f(Y/Y_n) - f(Z/Z_n)]$$
where
$$f(t) = \begin{cases} t^{1/3} & t > (6/29)^3 \\ \frac{1}{3}\left(\frac{29}{6}\right)^2 t + \frac{4}{29} & \text{otherwise} \end{cases}$$

In Equation (4), L represents brightness, but has a perceptionally uniform characteristic normalized to white of a current light source. Also, a* and b* represent the characteristic of red-green as opponent colors and that of blue-yellow as opponent colors, respectively. L is similar to Y, and a* and b* are similar to Cb and Cr in terms of the YCbCr color space.

CIE-L*C*h* is defined by CIE-L*a*b*, L* coordinates are the same as L* in L*a*b*, and C* and h*, which represent chroma and hue, are defined by Equation (5) below.

$$C_{ab}^* = \sqrt{a^{*2} + b^{*2}} \quad (5)$$
$$h_{ab} = \arctan\frac{b^*}{a^*}$$

C* and h* are similar to hue and saturation in the HSV color space or in the HSL color space as described above. However, coordinates in the above HSV or HSL color space are obtained from an input RGB to which a gamma correction is not applied, and, therefore, have difficulty in directly relating to a human visual system. Nevertheless, each of the C* and h* values also has perceptionally uniform characteristic.

In order to explain saturation perceived by the human eye, first, the meanings of the terms colorfulness, chroma and saturation will be briefly described. Colorfulness represents a color difference between any color and gray, and chroma can be defined as colorfulness for the brightness of a color, which looks white but is different than white in similar viewing conditions. Saturation can be defined as colorfulness for the brightness of a relevant color itself. Namely, even when the same color has different degrees of colorfulnesses depending on the brightnesses of the same color, the human eye can perceive the different degree of colorfulnesses of the color. Accordingly, with respect to saturation, it is possible to express saturation only after normalizing a current chroma value to a relevant brightness.

Therefore, saturation can be defined in the CIE-L*a*b* or CIE-L*C*h* color space by Equation (6) below.

$$S_{ab} = \frac{C_{ab}^*}{L^*} = \frac{\sqrt{a^{*2} + b^{*2}}}{L^*} \quad (6)$$

In Equation (6), in the same brightness (i.e. L* or Y), the higher a chroma value becomes (or the higher Cb-Cr values become), the higher a perceived saturation value becomes. Otherwise, in the same chroma value, the lower a brightness becomes, the higher a saturation value becomes, so that a person has the feeling that the relevant color becomes darker. On the contrary, in the same chroma value (similarly equal Cb-Cr values), the brighter a brightness becomes, the lower a perceived saturation becomes.

The existing method for changing only a Y value in the YCbCr color space has been frequently used for the efficient use of resources and based on the theory that the human visual system is more sensitive to luminance than chrominance. However, when the brightness of an output image is higher than that of an input image, the saturation perceived by the human eye is low, so that the image looks foggy and the image appears to be missing colors. However, several color space conversions, which are performed in order to make up for this disadvantage, significantly increase the complexity of hardware, and cause resource consumption and cost increase.

As a result, there is a need for a method in which brightness-controlling image conversion can be performed while maintaining a saturation thereof perceived by the human eye. Also, there is a need for a method in which the above brightness-controlling image conversion can be performed with low hardware complexity and low resource consumption.

SUMMARY OF THE INVENTION

Accordingly, the present invention has been made to solve the above-mentioned problems occurring in the prior art, and the present invention provides a method and an apparatus, which can achieve efficient resource management and the low complexity of hardware and can perform brightness-controlling image conversion while maintaining a saturation of the image perceived by the human eye, so that the method and the apparatus may be applied in a portable terminal environment.

In accordance with an aspect of the present invention, a method for brightness-controlling image conversion is provided. The method includes converting an input image of a first non-linear color space into a second linear color space; determining a brightness control ratio; adjusting channels of the second linear color space according to the brightness control ratio; converting the second linear color space into the first non-linear color space to form an output image.

In accordance with another aspect of the present invention, an apparatus for brightness-controlling image conversion is provided, the apparatus includes a color space convert to convert an input image of a first non-linear color space into a second linear color space; a brightness control ratio determiner to determine a brightness control ratio; a brightness controller to adjust channels of the second linear color space according to the brightness control ratio and convert the second linear color space into the first non-linear color space to form an output image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features, aspects, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of an apparatus and an operation method according to the present invention will be described in detail with reference to the accompanying drawings. The following description includes specific details such as specific elements, and the like, and the specific details are only provided to help more general understanding of the present invention. Therefore, it will be apparent to a person having ordinary skill in the art that changes in form and details may be made in the specific details without departing from the scope of the present invention. Moreover, detailed descriptions of known techniques related to the present invention will be omitted when it is determined that the detailed descriptions of the known techniques may unnecessarily obscure the subject matter of the present invention in explaining the present invention.

The present invention maintains a saturation perceived by the human eye by simultaneously changing a chroma value as much as the amount of brightness changed by an algorithm for brightness correction as shown in Equation (6) and is accompanied by the minimum use of resources and a minimum number of color space conversions so that the invention can be implemented in a mobile terminal. Also, the present invention provides a method for maintaining the original color when the increase of a brightness causes deviation from the color gamut of a relevant color.

Figure 1:
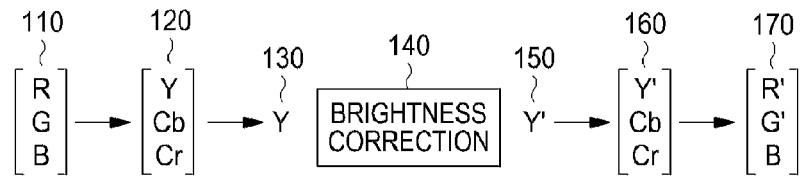
FIG. 1 illustrates a normal scheme for brightness correction.
Figure 2:
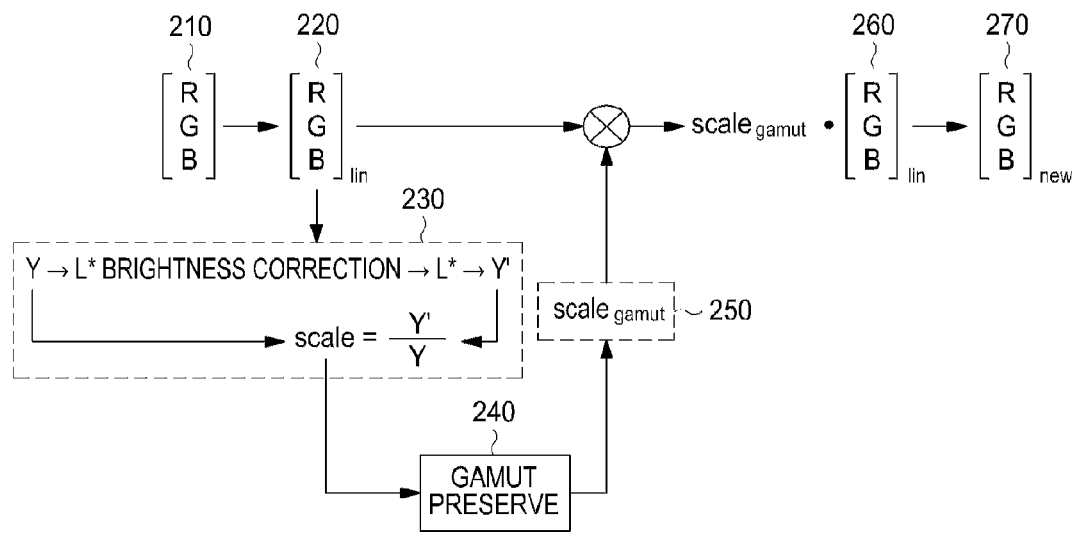
FIG. 2 illustrates a method for brightness-controlling image conversion according to an embodiment of the present invention.

FIG. 2 illustrates a method for brightness-controlling image conversion according to the present invention.

Referring to FIG. 2, a color space conversion is first performed in a method for brightness-controlling image conversion according to the present invention. In a color space conversion, an RGB color space of an image is converted to an XYZ color space.

The original file captured by a camera or a broadcasting camera may include signals proportional to the characteristics of an image sensor of the camera or broadcasting camera. However, assuming the original file is output by a display of 2.2 gamma, the original file is gamma-corrected and is stored as a computer file, or the original file is captured and is stored by/in a camera. A lot of files stored as described above are altered to meet the specification of an RGB color space so that they can show a similar performance on a Cathodes Ray Tube (CRT). Accordingly, the first process of color space conversion corresponds to a process for converting an input RGB 210 to a so-called linear RGB 220 after a process for gamma-uncorrecting input RGB values. In Equation (7), shown below, $C_{srgb}$ represents RGB values of an input image for which a value ranging from 0 to 255 is normalized to a value ranging from 0 to 1, and $C_{linear}$ as gamma-uncorrected linear RGB values has $R_{linear}$, $G_{linear}$ and $B_{linear}$ values obtained by applying the $C_{linear}$ to R, G and B of the input image.

$$C_{srgb} = \begin{cases} 12.92\, C_{linear}, & C_{linear} \leq 0.0031308 \\ (1+a)C_{linear}^{1/2.4} - a, & C_{linear} > 0.0031308 \end{cases} \quad (7)$$

where $a = 0.055$

The gamma-uncorrected linear RGB values are converted to XYZ values, according to values described in the IEC 61966-2-1:1999 standard document, by Equation (8) below.

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{linear} \\ G_{linear} \\ B_{linear} \end{bmatrix} \quad (8)$$

Brightness control (denoted by reference numeral 230) of the image is then performed. When it is assumed that the input image is converted to XYZ by Equation (8) and an algorithm for brightness correction then converts a Y value to a kY value, the above conversion result is the same as the result of changing only a Y value and inversely converting the changed Y value in YCbCr by the prior art. As a result, the algorithm for brightness correction is not different from the previous algorithm in that only the brightness is changed. However, if it is assumed that XYZ values are all multiplied by k and [X, Y, Z] is converted to [kX, kY, kZ], it may be considered the same as the case in which [R, G, B]$_{linear}$ becomes [kR, kG, kB]$_{linear}$. When this case is interpreted as a physical phenomenon, it may be considered to one in which a light source emits light while maintaining a predetermined RGB ratio. When [kX, kY, kZ] is substituted for [X, Y, Z] in an equation for calculating L*a*b*, L', a' and b' can be expressed by Equation (9) below.

$$L' = 116(ky)^{\frac{1}{3}} - 16 = 116k^{\frac{1}{3}}y^{\frac{1}{3}} - 16 \quad (9)$$

$$a' = 500\left[(kx)^{\frac{1}{3}} - (ky)^{\frac{1}{3}}\right] = k^{\frac{1}{3}}a^*$$

$$b' = 200\left[(ky)^{\frac{1}{3}} - (kz)^{\frac{1}{3}}\right] = k^{\frac{1}{3}}b^*$$

Therefore, a comparison of saturations corresponding to [X, Y, Z] and [kX, kY, kZ] gives Equation (10) below.

$$C'_{ab} = k^{\frac{1}{3}} C^*_{ab}, \quad (10)$$

$$h'_{ab} = \arctan\frac{k^{\frac{1}{3}}b^*}{k^{\frac{1}{3}}a^*} = \arctan\frac{b^*}{a^*}$$

$$saturation_1 = \frac{C^*}{L^*} = \frac{C^*_{ab}}{116(y)^{\frac{1}{3}} - 16}$$

$$saturation_2 = \frac{C^*}{L^*} = \frac{k^{\frac{1}{3}} C^*_{ab}}{116(ky)^{\frac{1}{3}} - 16} = \frac{C^*_{ab}}{116(y)^{\frac{1}{3}} - 16k^3}$$

Therefore, when an algorithm for brightness correction such as an HDR algorithm usually increases the brightness of output to that of input by 70% to 150% of an input image, the two saturation values do not show such a significant difference. More specifically, when an output image becomes much brighter than the input image, k>>1 and the denominator of saturation$_2$ value becomes somewhat smaller. Accordingly, a perceived saturation becomes a little higher, but there is no significant difference in that the slight increase of the perceived saturation corresponds to the result of causing a C*/L* value to be approximation to the human eye.

As can be seen from Equation (8), there is a linear relation between linearized RGB values and XYZ values. Accordingly, multiplying [X, Y, Z] by k has the same result as multiplying the linearized RGB values by k.

Figure 3:
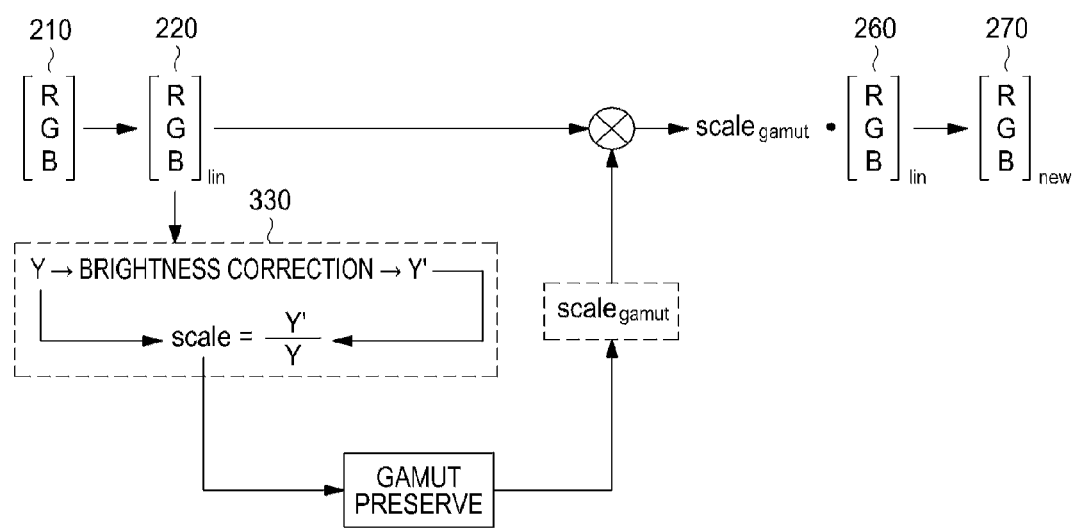
FIG. 3 illustrates a method for brightness-controlling image conversion according to another embodiment of the present invention.

Therefore, when the ratio of a Y value of the output image to that of the input image is represented by k (i.e., a scale value) and, for example, a brightness is controlled by using a histogram obtained in an L* space, an output L* value is converted to Y, and then the ratio of an output Y to an input Y is calculated, as shown FIG. 2. Then, linearized RGB values of the original image is multiplied by the calculated ratio, and so that a display of 2.2 gamma can display the linearized RGB values of the original image, the multiplication result is gamma-corrected as defined by Equation (11) below. FIG. 3 illustrates a method for brightness-controlling image conversion according to the present invention. In obtaining a histogram in a Y space, scaling can be performed (as denoted by reference numeral 330) on input/output values in the Y space without conversion to L* as shown in FIG. 3.

$$C_{linear} = \begin{cases} \dfrac{C_{srgb}}{12.92}, & C_{srgb} \le 0.04045 \\ \left(\dfrac{C_{srgb} + a}{1 + a}\right)^{2.4}, & C_{srgb} > 0.04045 \end{cases} \quad (11)$$

However, when there are values which exceed 255 among the linearized RGB values multiplied by k, the correction of a brightness control ratio (denoted by reference numerals 240 and 250) is performed in order to maintain color balance.

It is normal for each value which exceeds 255 to be lowered to 255 as an upper limit when there are values. The color balance of output RGB values may be lost, so that the output RGB values may look unnatural. Therefore, the present invention provides the application of an algorithm for increasing a color brightness up to the maximum brightness only to the extent that the color balance can be maintained.

Referring to FIGS. 2 and 3, a gamut preservation block 240 first checks whether there are values that exceed 255, among the linearized RGB values multiplied by k (i.e. output linearized RGB values). When any of the output linearized RGB values exceeds 255, the gamut preservation block 240 divides 255 by the largest value among the output linearized RGB values, and a new value, which is obtained by multiplying the result value of the division by the existing k, is represented by k' (where k'<k). Accordingly, when the linearized RGB values (i.e. the input linearized RGB values) are multiplied by k', the largest value among the resulting RGB values has 255 as an output value, and each of the remaining values has a value less than 255. Therefore, slightly reducing the brightness as a whole can prevent unnaturalness caused by deviating from a color gamut without losing the color balance. As described above, an output RGB 270 is obtained by multiplying (denoted by reference numeral 260) the linearized RGB by the k' value scale$_{gamut}$, which has been corrected.

Figure 4:
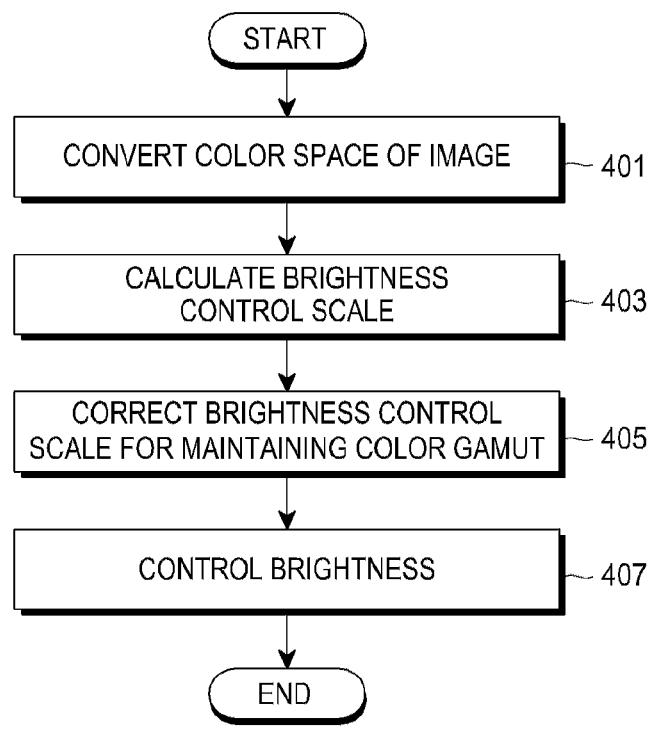
FIG. 4 is a flowchart illustrating a method for brightness-controlling image conversion according to, an embodiment of the present invention.

FIG. 4 is a flowchart showing a method for brightness-controlling image conversion according to an embodiment of the present invention. Referring to FIG. 4, in step 401, a color space of an input image is converted. Specifically, an input image of a first non-linear color space is converted into a second linear color space. For example, an RGB color space of the input image is converted to a linear RGB color space, and then the linear RGB color space is converted to an XYZ color space. In step 403, a brightness control ratio (scale) is calculated. The brightness control scale is expressed by the brightness of an output image to that of the input image, and may be a value received as input from a user or the outside or is previously set. In step 405, the brightness control scale is corrected in order to maintain color balance. When linearized RGB values are changed depending on the brightness control ratio received as input in step 403 and then deviation from a color gamut occurs, the brightness control ratio is reduced such that the color balance may be maintained without deviating from the color gamut. In other words, when a channel exceeding a predetermined color gamut exists among the channels of the second linear color space adjusted according to the brightness control ratio, the brightness control corrector corrects the brightness control ratio by multiplying the brightness control ratio, by a result value obtained by dividing a maximum value of the color gamut by a value of a highest channel among the adjusted channels of the second linear color space. In step 407, a new RGB is obtained by multiplying the linear RGB by the corrected brightness control ratio (scale$_{gamut}$), and brightness control is performed by using the obtained new RGB.

Figure 5:
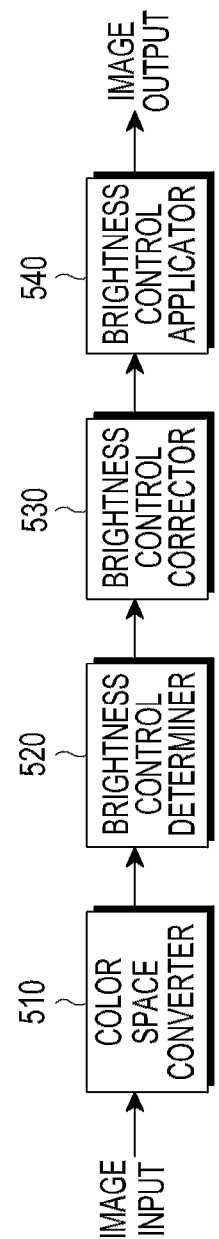
FIG. 5 is a block diagram illustrating the configuration of an apparatus for brightness-controlling image conversion according to an embodiment of the present invention.

FIG. 5 is a block diagram illustrating the configuration of an apparatus for brightness-controlling image conversion according to an embodiment of the present invention. Referring to FIG. 5, an apparatus for brightness-controlling image conversion according to the present invention includes a color space converter 510 for receiving an image as input, and converting a color space of the input image; a brightness control determiner (calculator) 520 for determining a brightness control ratio; a brightness control corrector 530 for applying the brightness control ratio, which has been determined by the brightness control determiner 520, to each channel in a linear RGB color space of the original image, and when there is a color which deviates from a color gamut, correcting a brightness control ratio in order to maintain color balance; and a brightness control applicator 540 for obtaining an output RGB by multiplying a linear RGB by the corrected brightness control ratio(scale$_{gamut}$), and performing brightness control by using the obtained output RGB.

The color space converter 510 coverts an input image in an RGB color space to a linear RGB color space, and then converts the linear RGB color space to an XYZ color space.

The brightness control corrector 530 multiplies each channel in the linear RGB color space of an image by the above brightness control ratio, and determines whether a channel exceeding a color gamut exists among the channels in the linear RGB color space of the image. When the channel exceeding the color gamut exists in the channels in the linear RGB color space, the brightness control corrector 530 obtains a result value by dividing a maximum value of the color gamut by the value of the highest channel, and determines, as a new brightness control ratio, a result value obtained by multiplying the result value of the division by the above brightness control ratio.

The brightness control applicator 540 generates an output image by multiplying each channel in the linear RGB color space of the image by the above corrected brightness control scale.

Figure 6A:
FIGS. 6A and 6B illustrate examples of the normal method and a method for brightness-controlling image conversion according to an embodiment of the present invention.
Figure 6B:

FIGS. 6A and 6B illustrate examples of the existing method and a method for brightness-controlling image conversion according to an embodiment of the present invention. FIGS. 6A and 6B illustrate the application result of the existing algorithm for correcting only a brightness of an image and that of an algorithm for keeping a brightness of an image while maintaining a saturation thereof according to an embodiment of the present invention, respectively. Particularly, judging from the difference between the color of a face shown in FIG. 6B and an ocher wall shown in FIG. 6A, the image is displayed in far better image quality by keeping the saturation of the image in the method according to the embodiment of the present invention.

According to an embodiment of the present invention, brightness can be controlled without reducing saturation in either a Television, a mobile phone or a projector phone. Accordingly, it is also possible to minimize the use of resources.

Specifically, the algorithm described above corrects a brightness of an image while maintaining a saturation thereof perceived by the human eye. Hence, it is possible to maintain far better color impression of the image than usual correction of only the brightness thereof.

The operation and the configuration may be implemented as described above in a method and an apparatus for brightness-controlling image conversion according to an embodiment of the present invention.

While the invention has been shown and described with reference to certain embodiments thereof, it will be understood by those skilled in the art that various changes in form and details may be made therein without departing from the spirit and scope of the invention. Therefore, the spirit and scope of the present invention must be defined not by the described embodiments thereof but by the appended claims their equivalents.

What is claimed is:

1. A brightness control method of an image, the method comprising:
    converting an input image of a first non-linear color space into a second linear color space;
    determining a brightness control ratio;
    adjusting channels of the second linear color space according to the brightness control ratio;
    converting the second linear color space into the first non-linear color space to form an output image; and
    when a channel exceeding a predetermined color gamut exists among the channels of the second linear color space adjusted according to the brightness control ratio, correcting the brightness control ratio by multiplying the brightness control ratio by a result value obtained by dividing, a maximum value of the color gamut of the second linear color space by a maximum value of the color gamut by a value of a highest channel among the adjusted channels of the second linear color space.

2. The method of claim 1, wherein the brightness control ratio is a ratio of a brightness of the output image to a brightness of the input image.

3. The method of claim 1, wherein converting an input image of a first non-linear color space into a second linear color space comprises:
    converting an input image in a Red, Green and Blue (RGB) color space to a linear RGB color space; and
    converting the linear RGB color space to an XYZ color space.

4. The method of claim 1, further comprising:
    multiplying each channel in the linear RGB color space of the image by the brightness control ratio;
    determining whether a channel exceeding a color gamut exists in the channels in the linear RGB color space of the image; and
    determining, as a new brightness control ratio, a result value obtained by multiplying the result value, which has been obtained by dividing a maximum value of the color gamut by a value of the highest channel, by the brightness control ratio when the channel exceeding the color gamut exists in the channels in the linear RGB color space.

5. The method of claim 4, further comprising:
    generating an output image by multiplying each channel in the linear RGB color space of the image by the new brightness control ratio.

6. A brightness control apparatus of an image, the apparatus comprising:
    a color space converter to convert an input image of a first non-linear color space into a second linear color space;
    a brightness control ratio determiner to determine a brightness control ratio;
    a brightness controller to adjust channels of the second linear color space according to the brightness control ratio and convert the second linear color space into the first non-linear color space to form an output image; and
    a brightness control corrector to correct the brightness control ratio, when a channel exceeding a predetermined color gamut exists among the channels of the second linear color space adjusted according to the brightness control ratio,
    wherein the brightness control corrector corrects the brightness control ratio by multiplying the brightness control ratio by a result value obtained by dividing a maximum value of the color gamut of the second linear color space by a value of a highest channel among the adjusted channels of the second linear color space.

7. The apparatus of claim 6, wherein the brightness control ratio is expressed by a ratio of a brightness of the output image to a brightness of the input image.

8. The apparatus of claim 6, wherein the color space converter converts an input image in a Red, Green and Blue (RGB) color space to a linear RGB color space, and converts the linear RGB color space to an XYZ color space.

9. The apparatus of claim 6, wherein the brightness control corrector multiplies each channel in the linear RGB color space of the image by the brightness control ratio; determines whether a channel exceeding a color gamut exists among the channels in the linear RGB color space of the image; and determines a new brightness control ratio and a result value obtained by multiplying a result value, which has been obtained by dividing a maximum value of the color gamut of the second linear color space by a value of the highest channel, by the brightness control ratio when the channel exceeding the color gamut exists among the channels in the linear RGB color space.

10. The apparatus of claim 9, wherein the brightness control corrector generates an output image by multiplying each channel in the linear RGB color space of the image by the corrected brightness control ratio.

* * * * *